United States Patent
Mokrzycki et al.

[11] Patent Number: 6,132,603
[45] Date of Patent: Oct. 17, 2000

[54] TRAP FOR CATCH BASINS AND PROCESS OF MAKING SAME

[75] Inventors: John T. Mokrzycki, Barrie; Danniel Bailey, Utopia, both of Canada

[73] Assignee: Munro Concrete Products Ltd., Barrie, Canada

[21] Appl. No.: 09/014,685

[22] Filed: Jan. 28, 1998

[51] Int. Cl.[7] .................................................. C02F 1/40
[52] U.S. Cl. ......................... 210/163; 210/170; 210/538
[58] Field of Search .................................. 210/162, 163, 210/170, 532.1, 538, 232

[56] References Cited

U.S. PATENT DOCUMENTS

| | | |
|---|---|---|
| 522,351 | 7/1894 | Phillips . |
| 788,721 | 5/1905 | Johnson . |
| 1,237,068 | 8/1917 | Loeb ........................................ 210/538 |
| 1,693,977 | 12/1928 | Egan ........................................ 210/163 |
| 1,758,318 | 5/1930 | Hayley . |
| 1,889,601 | 11/1932 | Heinkel .................................... 210/538 |
| 2,086,154 | 7/1937 | Boggs . |
| 2,745,510 | 5/1956 | Hultgren .............................. 210/532.1 |
| 2,749,303 | 6/1956 | Sitton ........................................ 210/538 |
| 3,789,987 | 2/1974 | Malaspina .............................. 210/232 |
| 4,522,533 | 6/1985 | Campbell et al. . |
| 5,101,849 | 4/1992 | Richard .............................. 210/532.2 |
| 5,433,845 | 7/1995 | Greene et al. .......................... 210/170 |
| 5,746,911 | 5/1998 | Pank ........................................ 210/538 |
| 5,753,115 | 5/1998 | Monteith ................................ 210/170 |

FOREIGN PATENT DOCUMENTS

| | | |
|---|---|---|
| 717806 | 9/1965 | Canada . |
| 730502 | 3/1966 | Canada . |

OTHER PUBLICATIONS

Waterloo Concrete Products Brochure, Jan. 1991 p. F–9—Goss Trap.

*Primary Examiner*—Christopher Upton
*Attorney, Agent, or Firm*—Barrigar & Moss; David Greer

[57] ABSTRACT

A trap for mounting in a catch basin having a wall with a cylindrical opening provided therethrough. The trap, which is designed to impede floating pollutants from leaving the catch basin, includes a front plate member with an outlet opening, a rear plate member with an inlet opening, and a connecting member extending between and connecting the front plate member and the rear plate member. The trap is arranged so that it can be mounted to the wall of the catch basin by inserting it through the cylindrical opening. A further aspect provides a trap having a front plate member with an outlet opening and a rear plate member with an inlet opening, and connecting means for mounting the plate members on the wall of the catch basin. Also provided is a process for constructing a trap in a side wall of a catch basin, comprising steps of boring a cylindrical opening through the side wall with a coring machine and securing a front plate member and a rear plate member to the side wall.

10 Claims, 3 Drawing Sheets

TRAP FOR CATCH BASINS AND PROCESS OF MAKING SAME

BACKGROUND OF THE INVENTION

This invention relates to a trap for the outlet of a catch basin, and a process for providing a catch basin with such a trap.

Catch basins often have an opening in one side wall that is adapted to be coupled to an outflow or outlet pipe. Typically, a trap may be provided at the opening in order to prevent floating pollutants, such as gas, oil, leaves and branches, from entering the outlet pipe and possibly plugging same. Such traps may also provide a water "plug" for preventing sewer gases from escaping from the outlet pipe, thus reducing offensive odours in the vicinity of the catch basin.

Currently, catch basins are usually constructed from concrete, and a number of trap devices for concrete catch basins have been devised.

For example, U.S. Pat. No. 3,789,987 issued Feb. 5, 1974 to J. A. Malaspina discloses a metal trap made of several components, including a U-shaped hood which is mounted on an inside wall of the catch basin. The trap disclosed in U.S. Pat. No. 3,789,987 can be unsatisfactory in some situations as part of the trap extends inside the catch basin. Additionally, the trap is secured to the catch basin by frictional engagement, which may not provide a satisfactory connection.

A number of manufacturers, such as Bibby Waterworks of Oakville, Ontario, Canada produce a goss trap which can be mounted in the wall of a catch basin at an elevated level and is formed from a rectangular front section and a rectangular rear section, with a connecting wall formed on each section and extending about its rectangular periphery. In order to install this goss trap in a catch basin, the concrete forming the catch basin is cast about the rectangular trap. This procedure is relatively expensive and is very time consuming.

Accordingly, it is desirable to provide a trap for a catch basin that includes relatively few parts and which is relatively easy and inexpensive to mount on a catch basin. A quick and relatively inexpensive process for providing a catch basin with such a trap is also desirable.

SUMMARY OF THE INVENTION

In accordance with one aspect of the present invention, there is provided a trap for mounting in a catch basin having a side wall with a cylindrical opening provided through the side wall. The trap includes a front plate member with an outlet opening located in an upper portion thereof, a rear plate member with an inlet opening located in a lower portion thereof, and a connecting member extending between and connecting the front plate member and the rear plate member such that the plate members are spaced apart from each other and the lowest point of the outlet opening is higher than the highest point of the inlet opening. At least one of the front plate member and the rear plate member is circular and has an outer diameter close to, but not exceeding, the diameter of the cylindrical opening. The one plate member and the connecting member are arranged such that the one plate member and the connecting member can be inserted into the cylindrical opening from one side of the side wall in order to mount the trap in the side wall. When the trap is mounted in the side wall, liquid leaving the catch basin through the cylindrical opening must pass through the inlet opening and then through said outlet opening.

Preferably, the rear plate member is a circular plate member having an outer diameter close to but not exceeding the diameter of the cylindrical opening. The connecting member may include a cylindrical wall section extending between the front plate member and the rear plate member, the cylindrical wall section having an outer cross-sectional diameter close to, but not exceeding, the inside diameter of the cylindrical opening. A portion of the front plate member may extend radially beyond the cylindrical wall section, thus providing a flange for engaging an exterior of the side wall, the flange including a plurality of bolt holes each adapted to receive a bolt for securing the trap to the catch basin.

Conveniently, the outlet opening can be a circular opening and the trap includes a cylindrical pipe connecting section surrounding the outlet opening and extending outward from the front plate member, the connecting section being adapted to mate with a drain pipe. A maintenance opening can be provided through an upper portion of the rear plate member and the trap includes a removable cover for connection to the rear plate member for covering the maintenance opening.

The inlet opening can have a generally semi-circular shape, a curved portion of which extends adjacent to a lower peripheral edge of the rear plate member. Preferably, the trap includes a sealant for sealing the joint between the catch basin and the trap. The front plate member, rear plate member and connecting member may be integrally formed from a high density polyethylene.

According to another aspect of the present invention, there is provided a catch basin with a trap. The catch basin with a trap includes a concrete catch basin having a side wall with an exterior side and an interior side and a cylindrical opening extending between the interior side and the exterior side, a front plate member, and a rear plate member. The front plate member has an outlet opening formed in an upper portion thereof and is secured to the exterior side such that the front plate member covers an end of the cylindrical opening and the outlet opening communicates with the cylindrical opening. The rear plate member has an inlet opening formed in a lower portion thereof and is secured to the interior side such that the rear plate member covers the other end of the cylindrical opening and the inlet opening communicates with the cylindrical opening, wherein the highest point of the inlet opening is lower that the lowest point of the outlet opening.

According to a further aspect of the present invention, there is provided a trap apparatus for mounting in an outlet hole formed in a wall of a catch basin. The trap apparatus includes a front plate member having an outlet opening located in an upper portion thereof and a width greater than a corresponding width of an outer end of the outlet hole, a rear plate member having an inlet opening in a lower portion thereof and a width greater than a corresponding width of an inner and of the outlet hole, and connecting means for mounting the plate members on the wall of the catch basin so that a peripheral portion of the front plate member is secured to an outside surface of the wall and a peripheral portion of the rear plate member is secured to an inner surface of the wall, the plate members being adapted to cover opposite ends of an outlet hole formed in the wall in a manner so that the lowest point of the outlet opening is higher than the highest point of said inlet opening.

According to still a further aspect of the present invention, there is provided a catch basin for gathering water run off. The basin including a concrete catch basin structure having a vertically extending side wall with a cylindrical outlet hole formed in the side wall and a trap device mounted in the outlet opening. The trap device has a front plate member with an outlet opening located in an upper portion thereof, a rear plate member with an inlet opening located in a lower portion thereof, and means rigidly connecting the front and rear plate members so that these plate members are spaced apart and the lowest point of the outlet opening is higher than the highest point of the inlet opening. At least one of the front plate member and the rear plate member is generally circular and has an outer diameter close to but not exceeding the diameter of the cylindrical outlet hole. The basin also includes means for sealing a juncture formed between the trap device and the side wall.

According to another aspect of the present invention, there is provided a process for constructing a trap in a side wall of a catch basin, the process comprising the steps of boring a cylindrical opening through the side wall with a coring machine, providing a front plate member with an outlet opening formed through an upper portion thereof and a rear plate member with an inlet opening formed through a lower portion thereof, and securing the front plate member and the rear plate member to the side wall such that the lowest point of the outlet opening is elevated above the highest point of the inlet opening and any liquid exiting said catch basin through said cylindrical opening during use of the catch basin must pass through said inlet opening and then subsequently through said outlet opening.

According to a further aspect of the invention, there is provided a trap for mounting in a catch basin having a side wall with a cylindrical outlet hole provided through the side wall. The trap includes a front plate member with an outlet opening located in an upper portion thereof, the front plate member having a width greater than a corresponding width of an outer end of the outlet hole. The trap also includes a circular rear plate member with an inlet opening located in a lower portion thereof, and a cylindrical connecting wall extending between and connecting the front plate member and the rear plate member such that the plate members are spaced apart from each other and the lowest point of the outlet opening is higher than the highest point of the inlet opening. The connecting wall has an outer diameter close to but not exceeding the diameter of the outlet hole and the connecting wall and the plate members provide a chamber which communicates with the outlet opening and the inlet opening.

BRIEF DESCRIPTION OF THE DRAWINGS

A detailed description of preferred embodiments is provided below with reference to the following drawings, in which.

DESCRIPTION OF THE PREFERRED EMBODIMENTS

Figure 1:
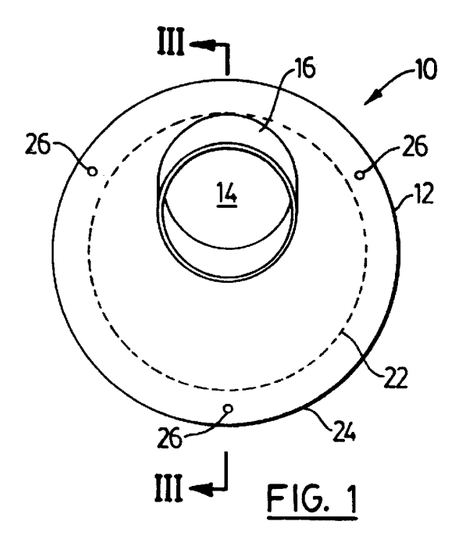
FIG. 1 illustrates in a front view a trap for a catch basin constructed in accordance with the present invention.
Figure 2:
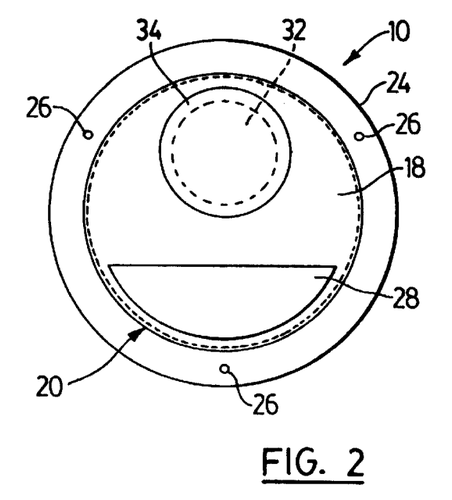
FIG. 2 illustrates a rear view of the trap of FIG. 1.
Figure 3:
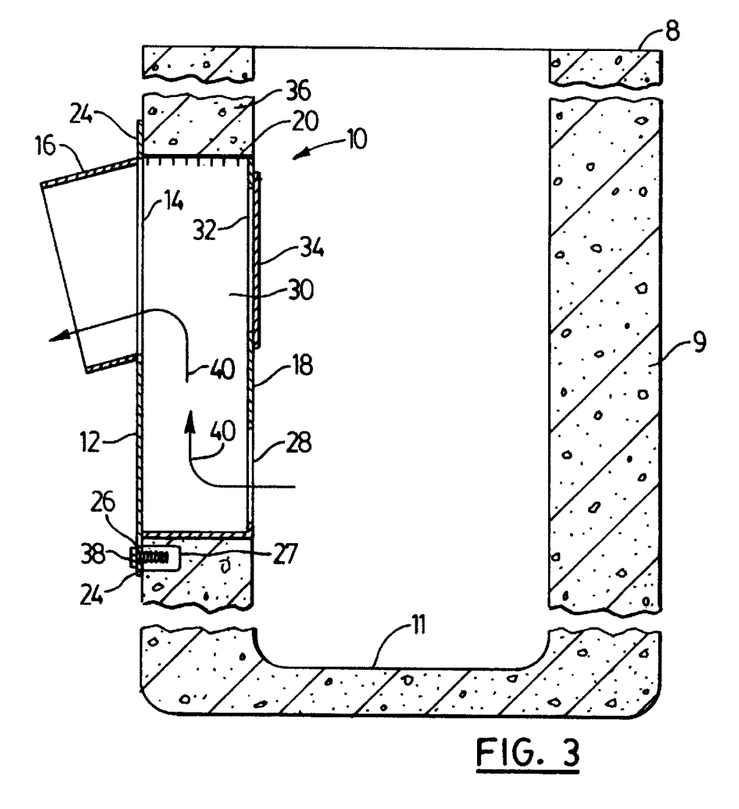
FIG. 3 is a cross-sectional view of the trap taken along the lines III—III of FIG. 1, as installed in a concrete catch basin.

Referring to FIGS. 1 to 3, there is illustrated a trap for a concrete catch basin 8 in accordance with a preferred embodiment of the present invention. Similar to conventional catch basins, the catch basin 8 has four upwardly extending rectangular side walls and a bottom wall 11.

The trap, indicated generally by 10, includes a circular front plate member 12. A circular outlet opening 14 is provided through an upper portion of the front plate member 12. A short, cylindrical pipe connecting section 16, which surrounds the opening 14, extends outwardly from a front side of the front plate member 12. The connecting section 16 is provided to allow an outlet pipe to be coupled to the trap 10.

The trap 10 also includes a circular rear plate member 18, which is connected to the front plate member 12 by a cylindrical connecting wall or section 20 which extends between the front plate 12 and the rear plate 18. The outer cross-sectional diameter of the connecting section 20 and the outer diameter of the rear plate 18 are substantially equal, with the result that the cylindrical connecting section 20 joins together with the rear plate 18 along the outer peripheral edge of the rear plate 18.

The front plate member 12 has a diameter which is larger than the outer cross-sectional diameter of the cylindrical connecting section 20, and the cylindrical connecting section 20 intersects the front plate member 12 along a perimeter indicated by the dashed line 22 in FIG. 1, thus providing an annular flange 24 around an outer periphery of the front plate 12. A number of holes 26 may be provided through the flange 24 so that the trap 10 may be mounted to the catch basin 8 as described further below.

A semi-circular inlet opening 28 is provided through a lower portion of the rear plate member 18. The size and location of the outlet opening 14 and of the inlet opening 28 are such that the highest point of the inlet opening 28 is lower than the lowest point of the outlet opening 14. The front plate member 12, the rear plate member 18, and the cylindrical connecting section 20 define an enclosure or chamber 30 which communicates with the inlet opening 28 and the outlet opening 14.

Preferably, the rear plate member 18 includes an upper circular maintenance opening 32 which is normally covered and sealed shut by a circular plug or cover 34 that is detachably mounted on the rear plate member 18. The circular cover 34 may be mounted on the rear plate member by bolts (not shown) or by other known types of connectors. The purpose of the circular cover 34 is to permit access, when required for cleaning and servicing purposes, to the interior 30 of the trap 10 and to the outlet opening 14 and pipe connecting section 16.

In order to mount the trap 10 to the catch basin 8, a large coring machine of known construction capable of cutting a circular hole in concrete is used to form a circular opening through a side wall 36 of the catch basin. The circular opening in the side wall 36 is at an elevated location above the bottom of the catch basin 8. Any suitable known coring machine for use on concrete could be used to provide the circular opening through the side wall 36. One such machine comprises a large cylinder with an open front end and teeth arranged about its circumference at this front end. The cylinder is rigidly connected to one end of a large rotatable shaft that is coaxial with the central axis of the cylinder.

The diameter of the circular opening made through the side wall 36 and the exterior diameter of the cylindrical connecting section 20 are selected such that the exterior diameter of the connecting section 20 will closely match the diameter of the opening in the side wall 36 so that the trap 10 can be mounted in the catch basin 8 by inserting the rear plate member 18 and the connecting section 20 into and through the opening in the side wall 36 until the flange 24 of the front plate member 12 engages an outer surface of the side wall 36. Bolts 38 can then be inserted through the holes 26 in the flange 24 and into suitably threaded bolt anchors 27 mounted in holes in the side wall 36 to secure the trap 10 in place.

A suitable sealing material such as butyl tape is used to seal the joint between the trap 10 and the side wall 36. Preferably, the butyl tape is located between the flange 24 and the outside surface of the side wall 36.

The axial length of the connecting section 20 is preferably such that the rear plate member 18 is substantially flush with the interior surface of the side wall 36 so that the trap 10 does not protrude into the interior of the basin 8. It will be appreciated that given the cylindrical shape of the opening through the side wall 36, the semi-circular configuration of the inlet opening 28 allows the largest possible inlet opening to be provided in the rear plate 18.

Once the trap 10 has been mounted to the catch basin 8, the catch basin 8 can be installed below grade and the inlet of an outlet pipe line (not shown) connected to the outlet opening 14 by means of the pipe connecting section 16. Conveniently, the pipe connecting section 16 may be angled downwards to mate with a downwardly angled outlet pipe line. It is also possible for the relatively short section 16 to extend perpendicularly from the front of the trap 10.

In use, water entering the basin will be retained therein until the water level rises above the lowest point of the outlet opening 14, at which time water will flow out of the basin 8 and into the outlet pipe (not shown) as indicated by the arrows 40 until the water level drops below the lowest point of outlet opening 14. It will be appreciated that when water is draining from the catch basin 8, the upper surface of the water is above the upper edge of the trap inlet 28 thus making it difficult for floating pollutants to leave the basin 8. Furthermore, as long as the water level remains above the upper edge of the trap inlet 28, a water "plug" is provided between the inlet 28 and outlet 14, thus preventing gaseous odours from the outlet pipe entering the catch basin 8, It will appreciated that the trap 10 is a cylindrical insert which can be easily mounted to a catch basin side wall once a cylindrical opening is provided through the side wall. As a cylindrical opening can be easily provided in a side wall with a coring machine, the fact that the trap 10 is specifically adapted for use with a cylindrical opening results in a trap that is easier and less time consuming to install in a catch basin than the aforementioned known rectangular goss trap. The trap of the present invention permits a catch basin manufacturer to pour a number of concrete catch basins without concern as to whether traps will be used with catch basins, and then easily adapt the catch basins for use with traps as required. It will of course be appreciated that the trap of the present invention could also be used in catch basins where the cylindrical opening was provided during casting of the catch basin.

The trap 10 is preferably made out of a high density plastic such as high density polyethylene, and the front plate member 12, rear plate member 18, and connecting section 20 may conveniently be integrally formed as a unitary structure. Alternatively, the trap 10 could be formed from other suitable materials such as galvanized steel.

In one embodiment, the dimensions associated with the trap 10 are as follows. The outer diameter of the rear plate member 18 and the outer diameter of the cylindrical connecting section 20 is 19.5" (50 cm), and the outer diameter of the front plate member 12 is 23.5" (60 cm). The front plate member 12 is spaced apart from the rear plate member 18 a distance of 6" (15 cm) by the connecting section 20. The circular outlet opening 14 has a diameter of 10" (25 cm) and the maintenance opening 32 in the rear plate member 18 has a diameter of 7.5" (19 cm) and its corresponding plug 34 has an outside diameter of 9" (23 cm). The semi-circular inlet opening 28 in the rear plate 18 is 16.125" (41 cm) wide at its longest horizontal point and 5" (13 cm) high at its longest vertical point. The lowest point of the outlet opening 14 is 3.75" (9.5 cm) higher than the highest point of the inlet opening 42.

It will be appreciated that the connecting section 20 need not be a continuous wall. Rather, the connecting section 20 could include one or more wall sections, or strut members, which extend between the front plate member 12 and the rear plate member 18. In the event the connecting section 20 is not a continuous wall, portions of the inner surface of the opening provided through the concrete side wall 36 would define the outer boundary of the. enclosure 30 when the trap 10 was mounted in the sidewall 36. Furthermore, the joints between each of the front plate member 12 and the rear plate member 18 and the side wall 36 would have to be sufficiently sealed to ensure pollutants could not bypass the plates.

As described above, the rear plate 18 of the trap has a diameter equal to the outer diameter of the connecting section 20 and the flange 24 is provided on the front plate member 12, which allows the trap 10 to be mounted on the side wall 36 by inserting it through the cylindrical opening from the outside of the catch basin 8. However, it will be appreciated that the outer dimensions of the front plate member and the rear plate member could be interchanged so that the trap 10 could be inserted into the opening in the side wall 36 from the interior of the catch basin 8, rather than from the exterior of the catch basin 8, if desired. It will be further appreciated that the trap 10 could be constructed for use with a catch basin having a curved or otherwise non-planar side wall by shaping the front and rear plate members to conform to the surfaces of the side wall.

Figure 4:
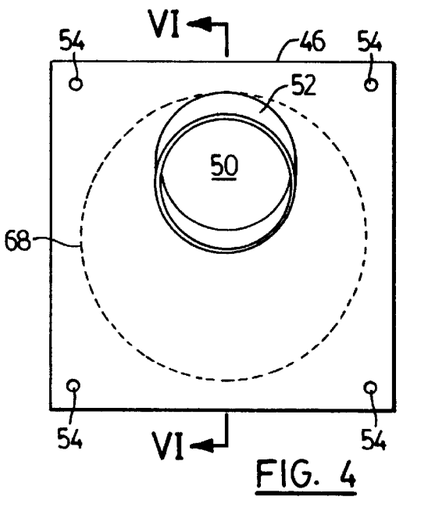
FIG. 4 is a front view of a front plate member of a second trap constructed in accordance with the invention.
Figure 5:
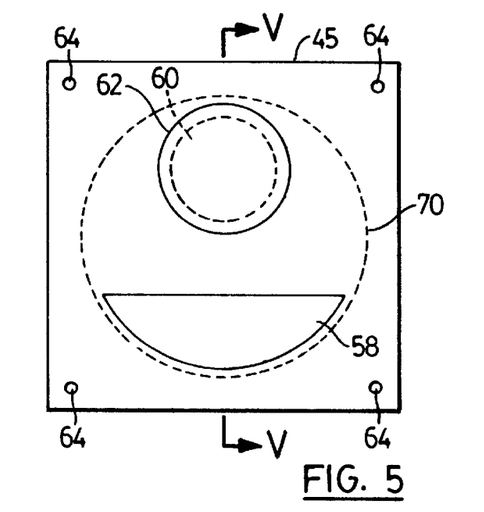
FIG. 5 is a rear view of a rear plate member of the second goss trap.
Figure 6:
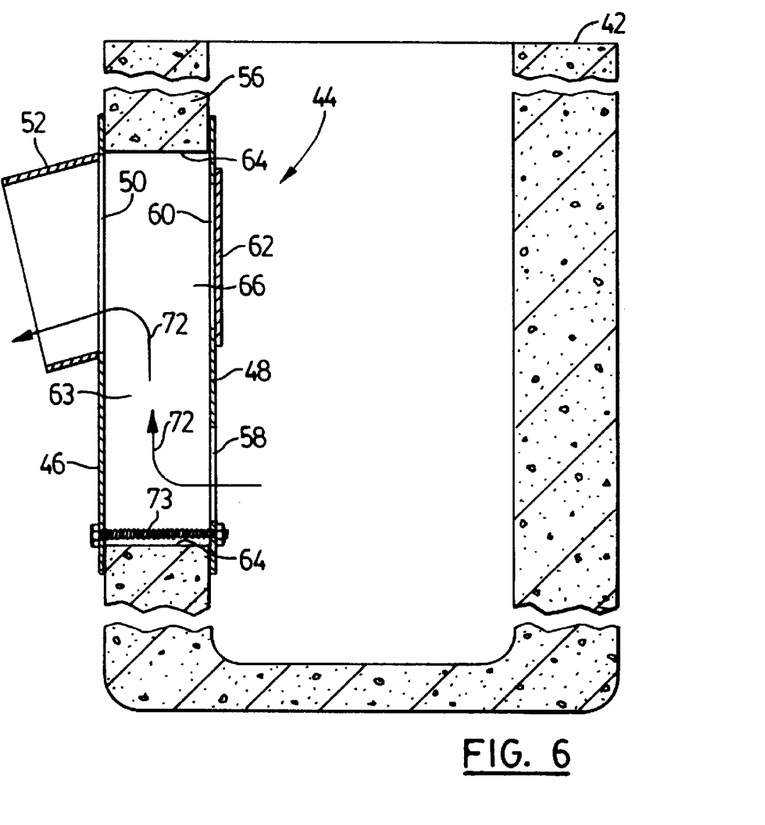
FIG. 6 is a cross-sectional view of the front plate member of FIG. 4 and the rear plate member of FIG. 5, taken along the line VI—VI of FIG. 4 and the line V—V of FIG. 5 respectively, as installed in a concrete catch basin.

FIG. 6 illustrates a concrete catch basin with a trap in accordance with a further preferred embodiment of the invention. Similar to conventional catch basins, the catch basin 42 has four upwardly extending rectangular side walls and a bottom wall. Unlike the trap 10 described above, the goss trap of FIG. 6, indicated generally by 44, does not include a cylindrical connecting wall or section. With reference to FIGS. 4 to 6, the trap 44 includes a square front plate member 46 and a square rear plate member 48. The front plate member 46 has a circular 12 outlet opening 50 formed in an upper portion thereof.

Preferably a cylindrical pipe connecting section 52 surrounds the outlet opening 50 and extends outwardly from the front plate member 46. Conveniently, the pipe connecting section 52 may extend from the front plate member 46 at a small downward angle. A plurality of bolt holes 54 may be provided through the front plate member 46 so that it can be connected to a side wall 56 of the catch basin 42 by suitable bolts (not shown).

The rear plate member 48 has a semi-circular inlet opening 58 formed in a lower portion thereof. Preferably, the rear plate 48 also includes an upper circular maintenance opening 60 which is normally sealed by a removable circular plug or cover 62. A plurality of bolt holes 64 may be provided through the rear plate member 48 for attaching the rear plate to a side wall 56 of the catch basin 42 by means of bolts (not shown).

In order to provide the catch basin 42 with the trap 44, a cylindrical opening 63 having a wall 64 is provided through the side wall 56 of the catch basin 42. The cylindrical opening 63 through the side wall 56 may be created by drilling with a suitable coring machine as described above.

Once the cylindrical opening 63 has been provided through the side wall 56, the trap 44 can be constructed by securing the front plate member 46 to the exterior surface of the side wall 56 and securing the rear plate member 48 to the interior surface of the side wall 56 such that an enclosure 66 is defined by the front plate member 46, the rear plate member 48 and the cylindrical wall 64 of the opening through the side wall 56. The inlet opening 58 and the outlet opening 50 each communicate with the enclosure 66 and are arranged such that the lowest point of the outlet opening 50 is higher than the highest point of the inlet opening 58. The perimeter along which the interior surface of the cylindrical wall 64 intersects each of the front plate member 46 and the rear plate member 48 is indicated by the dashed line 68 in FIG. 4 and the dashed line 70 in FIG. 5, respectively. As apparent from FIGS. 4 to 6, the front plate 46 and the rear plate 48 are each large enough so that they each extend beyond the perimeter of the opening 63, which allows front plate 46 to be secured with bolts through the holes 54 to the exterior of the side wall 56 and the rear plate 48 to be secured with bolts through the holes 64 to the interior of the side wall 56. The front plate member 46 and the rear plate member 48 can each be connected directly to the concrete side wall 56 of the catch basin 42 with separate bolts and/or anchors (not shown), or alternatively, it is possible to have bolt connectors 73 that extend from the front plate 46 to the rear plate 48 so that these two plates clamp the concrete wall between them. A suitable sealing material such as butyl tape is preferably used to seal the joint between the rear plate 48 and the side wall 36 and between the front plate 46 and side wall 36.

Once the trap 44 is completed, the highest point of the circular outlet opening 50 is located substantially adjacent to the highest point of the cylindrical wall 64 and the lowest point of the inlet opening 58 is located substantially adjacent to the lowest point of the cylindrical wall 64. In use, water can flow out of the catch basin in the directions of the arrows indicated by 72.

In one embodiment of the trap 44, the dimensions and spacing of the inlet opening, the outlet opening, the maintenance opening and the circular maintenance plug are the same as those described above for the trap 10.

Additionally, the diameter of the opening 63 hole provided through the side wall 56 is 19.5" (49.53 cm) and the front plate 46 and the rear plate 48 are each 23.5" (60 cm) high and wide. The side wall 56 is 6" (15 cm) thick. It will be appreciated that the front plate 46 and the rear plate 48 need not be square and could take a variety of other shapes including circular. It will be appreciated as well that the traps of the invention can be made in a wide variety of sizes in order to suit the particular requirements of a catch basin and the size thereof.

The preferred material for making the front and rear plates 46,48 is a high density plastic such as high density polyethylene, although other suitable materials such as galvanized steel would suffice.

The relative ease with which the cylindrical opening 63 through the side wall 56 can be cut allows the trap 44 in the catch basin 42 to be constructed in a quick and efficient manner. It will be appreciated that the front plate member 46 and the rear plate member 48 could be shaped to conform to a non-planar side wall. Also the traps of the invention can be installed at any time after the catch basin itself has been poured and otherwise completed.

Figure 7:
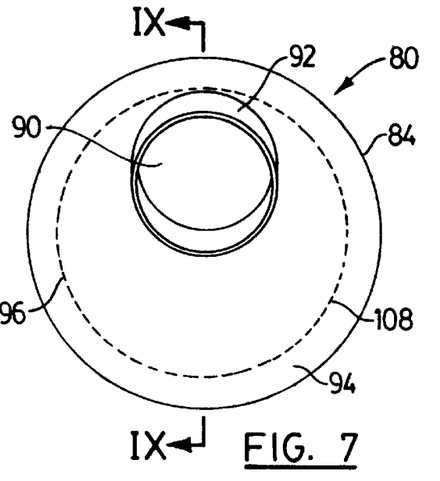
FIG. 7 is a front view of a third trap for a catch basin constructed in accordance with the present invention.
Figure 8:
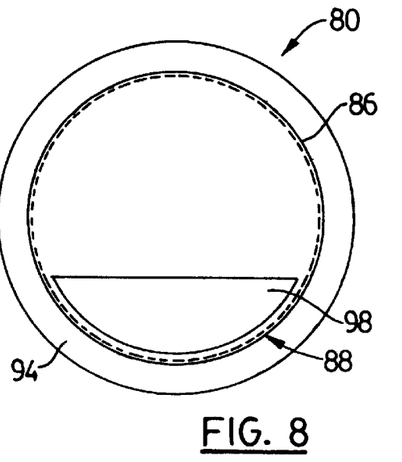
FIG. 8 is a rear view of the trap of FIG. 7.
Figures 9, 9A:
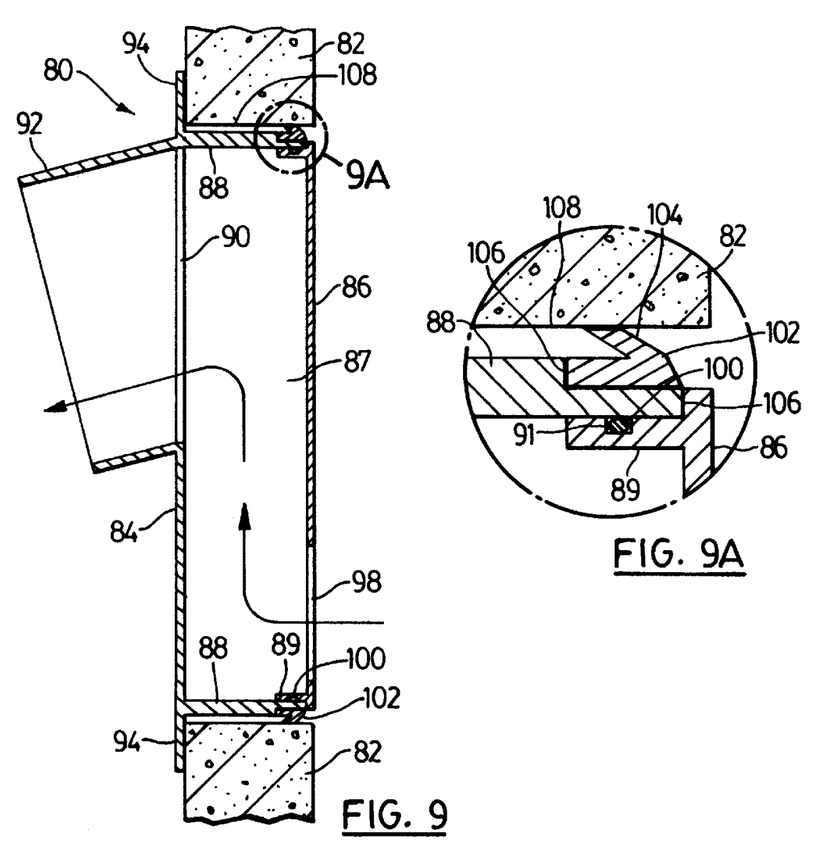
FIG. 9 is a cross-sectional view of the third trap taken along the lines IX—IX of FIG. 7, as installed in a side wall of a concrete catch basin.
FIG. 9a is an enlarged partial view of FIG. 9.

FIGS. 7, 8 and 9 illustrate a trap, indicated generally by 80, in accordance with a further preferred embodiment of the invention. The trap 80 is substantially the same in construction and use as the trap 10 described above, except for differences which will be apparent from the following description of the trap 80. The trap 80 includes a circular front plate member 84 and a circular rear plate member 86 which are connected together by a cylindrical connecting wall or section 88 which extends between the front plate member 84 and the rear plate member 86. The trap 80 is configured to be mounted in a cylindrical opening provided through a concrete side wall 82 of a conventional catch basin.

A circular outlet opening 90 is provided through an upper portion of the front plate member 84. A short, cylindrical pipe connecting section 92, which surrounds the opening 90, extends outwardly from a front side of the front plate member 84. The connecting section 92 is provided to allow an outlet pipe to be coupled to the trap 80.

A semi-circular inlet opening 98 is provided through a lower portion of the rear plate member 86. The size and location of the outlet opening 90 and of the inlet opening 98 are such that the highest point of the inlet opening 98 is lower than the lowest point of the outlet opening 90. The front plate member 84, the rear plate member 86 and the cylindrical connecting section 88 define an enclosure or trap chamber 87 which communicates with the inlet opening 98 and the outlet opening 90.

The trap 80 is preferably made out of a high density plastic such as high density polyethylene with the front plate member 84 and the connecting section 88 being integrally formed as a unitary structure. Preferably, the rear plate member 86 is removably connected to the connecting section 88. In this regard, the rear plate member 86 preferably includes an inwardly extending cylindrical flange 89 adjacent to its peripheral edge. The outer diameter of the flange 89 is substantially equal to the inner diameter of the connecting section 88 such that the rear plate member 86 can be secured to the connecting section 88 by frictional engagement between the outer surface of the flange 89 and the inner surface of the connecting section 88. The flange 89 may include a continuous recess 91 on its outer surface for receiving a O-ring gasket 100 in order to ensure a water tight seal exists between the flange 89 and the cylindrical connecting section 88. The provision of a removable back plate 86 eliminates the requirement of a separate maintenance opening, and provides improved access to the chamber 87 and the outlet opening 94 for cleaning purposes.

The outside diameter of the connecting section 88 is slightly less than that of the inside diameter of the hole provided through the side wall 82 and a resilient sealing gasket 102 extends around the outside of the cylindrical connecting section 88. The gasket 102 is preferably located along the rear edge of the connecting section 88. The gasket 102 is preferably a single off-set gasket, which are commonly known in the art, and has an outwardly extending portion 104 for engaging the inner surface 108 of the hole through the concrete side wall 82. A shoulder or edge 106 is preferably provided around the outer surface of the connecting section 88, against which the gasket 102 can rest. The outer diameter of the rear plate 86 is preferably substantially equal to that of the connecting section 88 such that an outer peripheral edge of the rear plate member 86 rests against the rearward facing edge 106 of the connecting section 88 when the rear plate 86 is mounted on the connecting section 88.

The front plate member 84 has an outer cross-sectional diameter larger than the outer cross-sectional diameter of the cylindrical connecting section 88, and the cylindrical connecting section 88 intersects the front plate member 84 along the perimeter indicated by the dashed line 108 in FIG. 7, thus providing an annular flange 94 around an outer periphery of the front plate 84. In order to mount the trap 80 to the side wall 82 of the catch basin, the rear plate member 86 and the connecting section 88 are inserted through the opening in the side wall 86 until the flange 94 of the plate member 84 engages an outer surface of the side wall 82. A suitable sealing substance such as butyl tape is provided on the inner surface of the flange 94 such that when the flange 94 comes in contact with the outer surface of the side wall 82 a water tight seal is formed between the flange 94 and the outer surface of the side wall 82.

When the connecting section 88 is inserted into the opening through the side wall 82, the outwardly extending portion 104 of the gasket 102 contacts the inner surface 108 of the hole through the side wall 82. The shoulder 106 in the connecting section 88 ensures that the gasket 102 stays in its proper location and is not displaced as the connecting section 88 is pushed into the opening in the side wall 82. The outwardly extending portion 104 of the gasket 102 is resilient and in its non-deformed state has an outer diameter larger than the inner diameter of the hole through the side wall 82, such that the portion 104 is deformed and compressed as the trap 80 is mounted on the side wall 82.

Once fully inserted into the opening through the side wall 82, the trap 80 is temporarily held in place by the butyl tape around the flange 94 and frictional engagement between the gasket 102 and the surface 108, which is sufficient to hold the trap 80 in place during shipping of the catch basin. Once the catch basin is installed in its desired location, the force of the outlet pipe connected to the pipe connecting section 92 and the force of the back fill placed around the catch basin press the trap 80 against the catch basin side wall 82 with sufficient force to keep the trap 80 in place. Thus, the trap 80 does not require bolts or similar hardware to keep it in place. Preferably the gasket 102 forms a water tight seal around the rear edge of the connecting section 88 so that water does not enter the annular space between the connecting section 88 and the wall 108 of the opening through the side wall 82. This prevents corrosion of any reinforcing wire which may be exposed when the cylindrical opening is cored through the side wall 82.

As discussed above, the diameter of the rear plate member 86 does not exceed the diameter of the outlet hole through the side wall 82 so that the trap 80 can be inserted into the outlet hole while the plate 86 is connected to the connecting wall 88. However, the plate 86 could have a larger diameter, in which case it would be connected to the connecting wall 88 from the inside of the catch basin after the trap 80 was mounted in the side wall 82.

As will be apparent to those skilled in the art in the light of the foregoing disclosure, various alterations and modifications are possible in the practice of this invention without departing from the spirit or scope thereof. Accordingly, the scope of the invention is to be construed in accordance with the substance defined by the following claims.

We claim:

1. A trap for mounting in a catch basin having a side wall with a cylindrical opening provided through the side wall, the trap comprising:

a front plate member with an outlet opening located in an upper portion thereof and having a flange portion for engaging an outer surface of the side wall;

a rear plate member with an inlet opening located in a lower portion thereof; and a connecting member extending between and connecting said front plate member and said rear plate member such that said plate members are spaced apart from each other and the lowest point of said outlet opening is higher than the highest point of said inlet opening, said rear plate member being circular and having an outer diameter close to, but not exceeding, the diameter of the cylindrical opening, said rear plate member and said connecting member being arranged such that said rear plate member and said connecting member can be inserted into the cylindrical opening from an outside of said catch basin in order to mount the trap in the side wall, wherein when said trap is mounted in the side wall, liquid leaving said catch basin through the cylindrical opening must pass through said inlet opening and then through said outlet opening and said flange portion engages the outer surface of the side wall.

2. A trap according to claim 1 wherein said connecting member comprises a cylindrical wall section extending between said front plate member and said rear plate member, said cylindrical wall section having an outer cross-sectional diameter close to, but not exceeding, the inside diameter of the cylindrical opening.

3. A trap according to claim 2 wherein the flange portion of said front plate member extends radially beyond said cylindrical wall section for the entire circumference of said cylindrical wall section such that when the trap is mounted in the side wall, said flange portion engage the outer surface of the side wall around the entire circumference of the cylindrical opening.

4. A trap according to claim 3 further including a sealant tape on an inner surface of said flange portions for securing the trap to the catch basin.

5. A trap for mounting in a catch basin having a side wall with a cylindrical outlet hole provided through the side wall, the trap comprising:

a front plate member with an outlet opening located in an upper portion thereof said front plate member having a flange portion for engaging an outer surface of the side wall round the circumference of an outer end of the outlet hole;

a rear plate member with an inlet opening located in a lower portion thereof; and a cylindrical connecting wall extending between and connecting said front plate member and said rear plate member such that said plate members are spaced apart from each other and the lowest point of said outlet opening is higher than the highest point of said inlet opening, said connecting wall having an outer diameter close to but not exceeding the diameter of the outlet hole, said connecting wall and said plate members providing a chamber which communicates with said outlet opening and said inlet opening.

6. A trap according to claim 5 further including a sealant tape extending around an inner surface of said flange member for securing said front plate member to the side wall when said trap is mounted in the catch basin.

7. A trap according to claim 5 wherein said rear plate member is a circular plate member having an outer diameter close to but not exceeding the diameter of the cylindrical outlet hole.

8. A trap according to claim 5 wherein said rear plate member is removably connected to said cylindrical connecting wall.

9. A trap according to claim 8 wherein said rear plate member includes an inwardly extending cylindrical flange member for engaging an inner surface of said cylindrical connecting wall.

10. A trap according to claim 5 further including a resilient gasket member extending around said cylindrical connecting wall for sealingly engaging an inner surface of the outlet hole when said trap is mounted in the catch basin.

* * * * *

UNITED STATES PATENT AND TRADEMARK OFFICE
CERTIFICATE OF CORRECTION

PATENT NO. : 6,132,603
DATED : October 17, 2000
INVENTOR(S) : Mokrzycki et al

Page 1 of 1

It is certified that error appears in the above-identified patent and that said Letters Patent is hereby corrected as shown below:

<u>Title page,</u>
Item [30], insert the following:
-- May 23, 1997 (CA)     2,205,973 --

Signed and Sealed this

Twenty-third Day of October, 2001

Attest:

NICHOLAS P. GODICI
*Attesting Officer*     *Acting Director of the United States Patent and Trademark Office*